Feb. 16, 1954        K. SCHMITT        2,669,157
ENDLESS SLIDE CHAIN PICTURE PROJECTOR
Filed July 16, 1952        5 Sheets-Sheet 2

INVENTOR
KARL SCHMITT
BY Haseltine, Lake + Co.
AGENTS

INVENTOR
KARL SCHMITT
BY Haseltine, Lake & Co.
AGENTS

Feb. 16, 1954  K. SCHMITT  2,669,157
ENDLESS SLIDE CHAIN PICTURE PROJECTOR
Filed July 16, 1952  5 Sheets-Sheet 5

INVENTOR
KARL SCHMITT
BY Haseltine, Lake & Co.
AGENTS.

Patented Feb. 16, 1954

2,669,157

UNITED STATES PATENT OFFICE 2,669,157

ENDLESS SLIDE CHAIN PICTURE PROJECTOR

Karl Schmitt, Fulda, Germany

Application July 16, 1952, Serial No. 299,121

3 Claims. (Cl. 88—28)

This invention relates to a projector in which a multiplicity of transparent positives or diapositives assembled to form an endless chain are automatically moved past a source of light and projected.

A main object of the invention is to provide for a convenient arrangement of the chain of pictures with relation to the driving mechanism and the lighting-optical assembly.

Another object of the invention is to provide a drive mechanism such that during a preponderant part of the time there will take place a change of pictures whilst the picture will be stationary only during a comparatively short time.

A further object of the invention is directed to the construction of the chain of pictures or diapositives to permit any desired quantity of pictures to be assembled in a simple and ready manner preferably so as to form an endless chain.

Further objects of the present invention will be more apparent from the following detailed description taken in conjunction with the accompanying drawings.

In the use of projectors in particular for advertising purposes it is already known to assemble diapositives in form of an endless chain freely suspended from a rotatable drum and to provide a power drive for rotating the drum carrying with it the chain so as to place all diapositives successively into the trace of rays for being projected. In this motion each single picture is held stationary on the screen for a longer interval of time and is then suddenly removed whereupon the next picture in the sequence appears comparatively quickly. For advertising purposes, such as in shopwindows, these projectors are less satisfactory since the stoppage time of the pictures is a multiple of time during which the picture is in motion. It will be appreciated that for advertising it is important to display a motion for which purpose the hitherto known projectors are comparatively unsuitable. Accordingly it must be aimed at to shorten the stoppage time and to extend as much as possible the time interval during which motion takes place. In the embodiment of the invention shown by way of example this has been realized in that the time required for changing the picture is a multiple of its stoppage time, the motion time being e. g. about 17 seconds whilst the picture is held stationary for only 4 seconds. The fact that the changing of pictures takes place exceedingly slowly permits that the picture or the text may be read off line for line with great ease. After the last line, i. e. when the picture has completely appeared on the screen, the diapositive will remain stationary only for a short interval of time disappearing thereafter with the same speed of motion with which it appeared. This manner of advancing the pictures provides an almost constant motion of the picture carrying chain so that the eyes of the passers-by are caught in almost every moment. During the slow passing of the picture its contents will be taken in by the observer so efficiently that after the entire picture being on the screen only a stoppage time of the chain of very short duration will be required.

In contrast to the known constructions in which the drum together with the chain requires a comparatively large space the construction according to the invention provides considerable economy in space. The entire drive mechanism, the source of light and the lighting equipment are accommodated within the interior of the space included by the picture carrying chain. This has been made possible by causing the chain to run over a bow capable of serving as a guide. By using the space immediately beneath the semi-circular bow to accommodate the drive mechanism below which again the optical equipment such as the source of light, a parabolic reflector, the condenser lenses etc. have been arranged, the economy in space is so relevant that the apparatus of the present invention requires only about one half of the dimensions of the usual constructions.

The preferred solution of the problem to shorten as much as possible the stoppage time of the picture and to extend the period of motion correspondingly has led to the construction of drive mechanism for the chain which substantially comprises a ratchet-type gripper capable of engaging the projections or recesses of the picture chain in order to advance it for the length of a picture. During its retrograde movement the gripper slides past the chain elements without moving them. The gripper itself is mounted for easy motion on a one-armed lever which is raised by a hook movably attached thereon. This is obtained by hooking the draw bar in a crank pin moving at constant speed on a circular path. A second crank pin which is offset from the first named by 180° effects the disengagement of the draw hook as soon as it has reached the uppermost point of its circular path. At this point the draw bar together with the one-armed lever and the gripper secured thereon falls downward under the action of gravity where the gripper engages behind the next picture of the chain to repeat the cycle of operation during which draw hook, lever and gripper are again raised by the crank pin whereby the chain is advanced by the length of one picture.

It will be noted from the foregoing that the picture during the time in which draw hook, lever and gripper fall down and the draw hook again hooks in the chain and with it the picture just being projected will be at a standstill. This period is comparatively very short. The following period during which the crank pin raises the system thereby advancing the chain by the length of one picture is considerably longer. As already mentioned hereinbefore, time relations of 1:4 and higher can easily be obtained.

It is clear that any device may be used adapted to transform a continuous movement into a periodic discontinuous one, e. g. it is possible to use a so-called Maltese cross. This consists of a cross the cross beams of which show on their outsides concave recesses. The spaces between the beams form slots. The cross is rotatable around its centre. Besides the cross a disc is provided, the diameter of which is thus chosen that it engages exactly the concave recess mentioned above. Thereby a rotating of the cross is prevented. The disc is provided with a recess on its circumference. In front of this recess a pin is placed parallel to the axis of the disc but the distance of this pin from the centre of the disc is somewhat larger than the diameter of the disc. When the disc is rotated, the Maltese cross is not moved until the pin engages one of the slots between the beams of the cross. Thereby the Maltese cross is rotated to a certain extent, the angle of rotation depending on the number of the beams of the cross. The correct periods are obtained by a corresponding design of the Maltese cross i. e. of its diameter, partition, etc. This Maltese cross now can transfer its movements on the chain of diapositives by means of a claw in a similar way as described above. It is also possible to use a friction roll, a wheel or the like which is driven from the Maltese cross, this friction roll in turn operating the chain of diapositives. Furthermore a tooth wheel may be used in which some teeth have been left out in regular intervals. Furthermore an electromotor may be used governing a driving shaft for the chain via a contact wheel. Finally it is possible to provide a driving mechanism consisting of a correspondingly shaped cam wheel resulting in periodically lifting and lowering of the one-arm lever on which the gripper for the chain is placed.

In this connection the constructional features of the chain are of essential importance. According to this invention the chain comprises frame-like members hingedly and detachably secured together by suitable links. Further details of this construction will become apparent from the following description.

Instead of frames it is also possible to use members having claws by which the diapositive is clamped on its frame. If frames are used it is not necessary to connect each two chain members by means of an intermediate member. It is also possible to provide a construction where movement is obtained by a gripper, the hooklike end of which does not engage behind an intermediate member but into the slot between two diapositives. Finally it is also possible to drive the chain of diapositives by pressing a friction roll from below towards the chain.

The fact that the chain is composed of individual links of any desired number which, however, should not be less than 15 to 20, permits to give the chain any desired length. In order to enable the chain to be freely suspended and if a predetermined number of members, such as 25, is surpassed the lower part of the casing which may be closed by a flap will be opened so that the chain may extend freely downward beyond the casing.

The number of members of course to a far extent depends on the size and form of the endless chain, the shape and design of the members and their interconnection.

The projector as defined hereinafter is primarily intended for long period-operation, but it may be used also with advantage for lectures as owing to the convenient arrangement of the pictures in a continuous chain there will be no longer difficulties caused by a confusion of pictures in a dark room. In lectures it may become necessary, however, to have the pictures stationary on the screen for a shorter or a longer period of time so that it is recommended in cases where the projector is used also for lectures to provide a throw-out device for the automatic picture drive mechanism so that by a simple manipulation of a switch, lever or the like, if desired, the motion of the one or of the other picture may be temporarily stopped. Further details relating to this particular feature will be given hereinafter.

One embodiment of the invention as well as constructional details thereof are illustrated by way of example in Figs. 1 to 8 in which Fig. 1 is a perspective view of a projector embodying the invention with the front wall being removed and the housing for the drive mechanism and the lighting equipment being screwed off;

Figure 1:
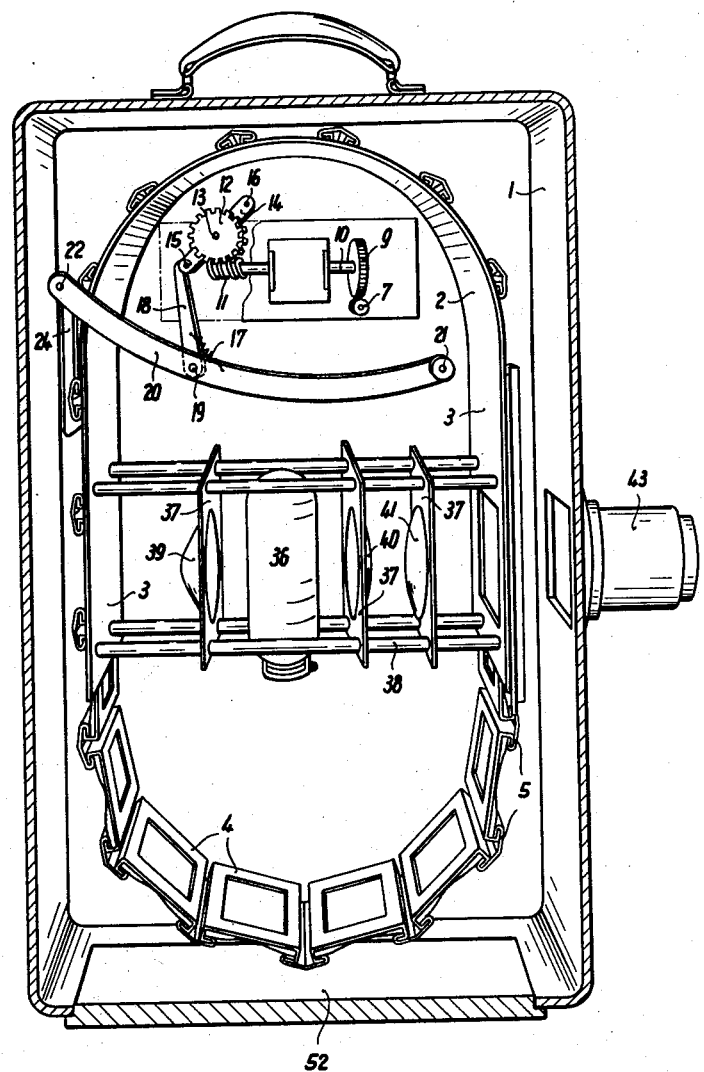

In the casing 1 there is arranged a semi-circular bow 2 having two parallel downwardly extending extensions 3 serving as a guide for the picture carrying chain formed by individual links 4 and connecting members 5. Within the semi-circular space of the bow 2 there is arranged the drive mechanism including suitable source of power, e. g. a watch work, preferably a driving motor 6 the shaft of which carries at its one end a worm 7 and at its other end a fan 8 serving to ventilate the casing and thus to carry away the heat produced by the source of light.

The worm 7 meshes with a worm wheel 9 secured to a shaft 10 which carries at its other end a further worm 11. This latter has driving engagement with another worm wheel 12 keyed on the shaft 13. The shaft 13 has mounted thereon a crank gear 14 with two crank pins 15 and 16 respectively. Either of these crank pins 15 or 16 may be engaged by a draw hook 16 placed under the action of a spring 17. The draw bar 18 is pivotally mounted on a one-armed main lever 20 rotatable at its one end about a pivot 21 and carrying at its other end a shaft 22 to the free end 23 of which a ratchet-type gripper 24 is secured. The free end of this gripper is provided with an inclined surface 25 and a lug 26 for engagement behind the connecting member 5a of the two chain links or frames 4a and 4b.

Figure 2:
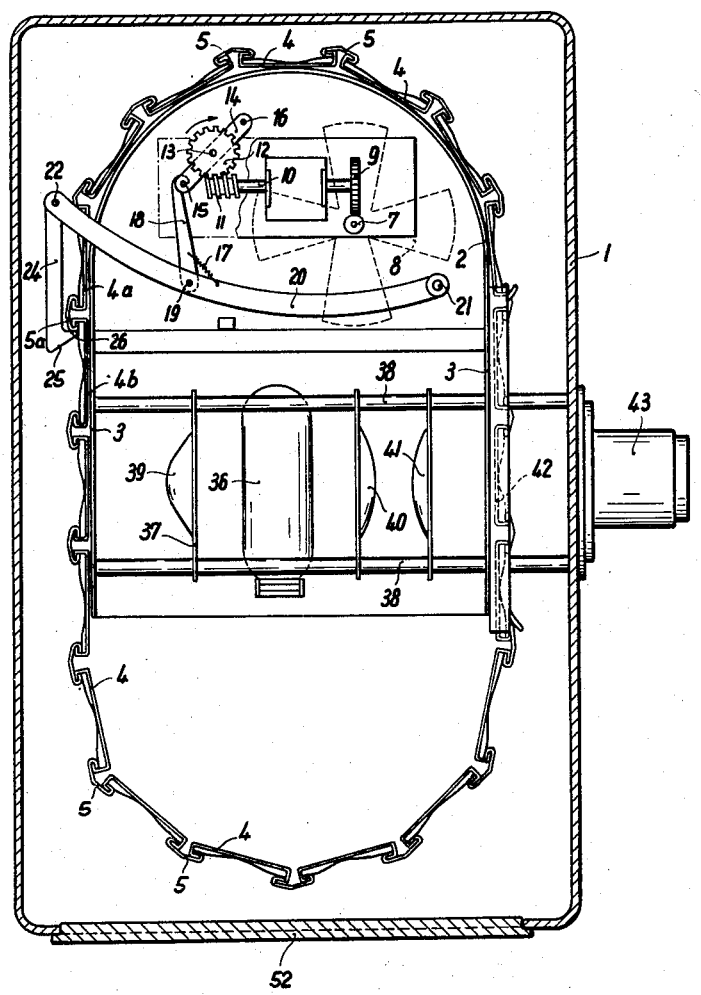
Fig. 2 is a lateral view of a projector with its casing opened.
Figure 3:
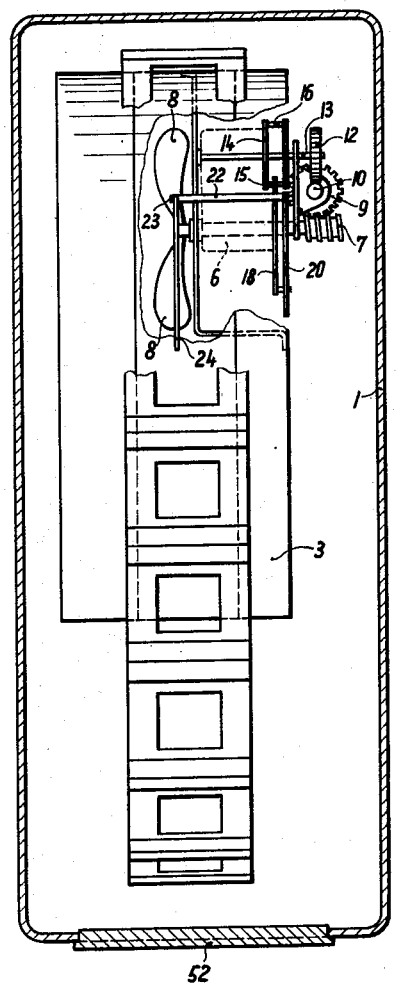
Fig. 3 is a lateral view partly in section of a projector in a sheet metal casing.

With the electric motor 6 being switched-on, the crank gear 14 rotates in direction of the arrow. In the position shown in the Fig. 2 the draw hook 18 has engagement with the crank pin 15. The rotation of the crank gear results in the draw hook together with the main lever 20 being raised carrying along the gripper 24. Since the lug 26 of the gripper 24 has engaged behind the connecting member 5a, the entire chain is advanced in clockwise direction. After the crank pin 15 having reached the highest point of its revolving motion the crank pin 16 now in its lowermost position strikes from the right against the draw hook whereby the latter is disengaged from the crank pin 15. This, in turn, results in the main lever 20 together with the gripper 24 falling downward under the action of gravity. Owing to its inclined surface 25 the gripper slides over all projections until engaging beneath the next picture or frame. Upon further rotation of the crank gear in clockwise direction the draw hook 18 will become engaged with the crank pin 16 after which the cycle of operation is repeated and the picture carrying chain advanced by the length of one picture.

Figure 5:
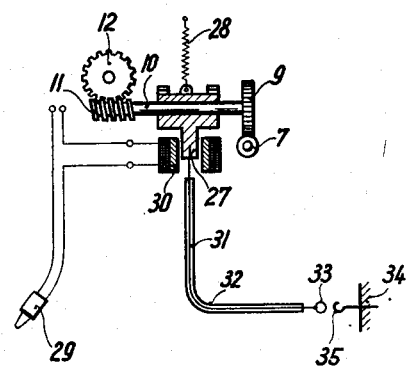
Fig. 5 is a diagrammatic view of the throw-out device of the drive mechanism.

In order to be able to interrupt the motion of the picture chain in the use of the projector for lectures, a throw-out device may be provided such as illustrated in Fig. 5.

The bearing carrying the gear shaft 10 is movably arranged and held in its normal position by a spring 28 such as to retain the worm 11 and the worm wheel 12 in engagement with each other. Upon actuation of the switch 29 the magnet 30 will be energized and the bearing 27 attracted so that the worm 11 and the worm wheel 12 will be disengaged. Instead of effecting the disengagement of the throw-out device by electrical means also other suitable means, e. g. a bowden cable 31 in a sheath 32 may be used. By pulling on the handle or ring 33 the same result is obtained as by pressing the switch 29 i. e. the disengagement of worm 11 and worm wheel 12. The mechanism may be retained in this position by hooking the ring or handle in the hook 35 fixedly secured to the housing 34.

Beneath the mechanism described in the foregoing the lighting and optical equipment is installed which includes a specially designed source of light 36 and a parabolic reflector 39, the latter being mounted on a quadratic sheet metal 37 held by cross members 38 and arranged behind that source of light. In front of the source of light two suitable condenser lenses 40 and 41 are provided. The diapositive 42 actually in front of the light opening is reproduced on the screen by the objective in the tube 43.

As already mentioned hereinbefore the endless chain of pictures is formed by individual frame-like links of which each contains an ordinary diapositive between two glass plates. The single frames are held together by connecting members slid over them or hooked in their ends which permits to form chains of any desired number of links.

Figure 4:
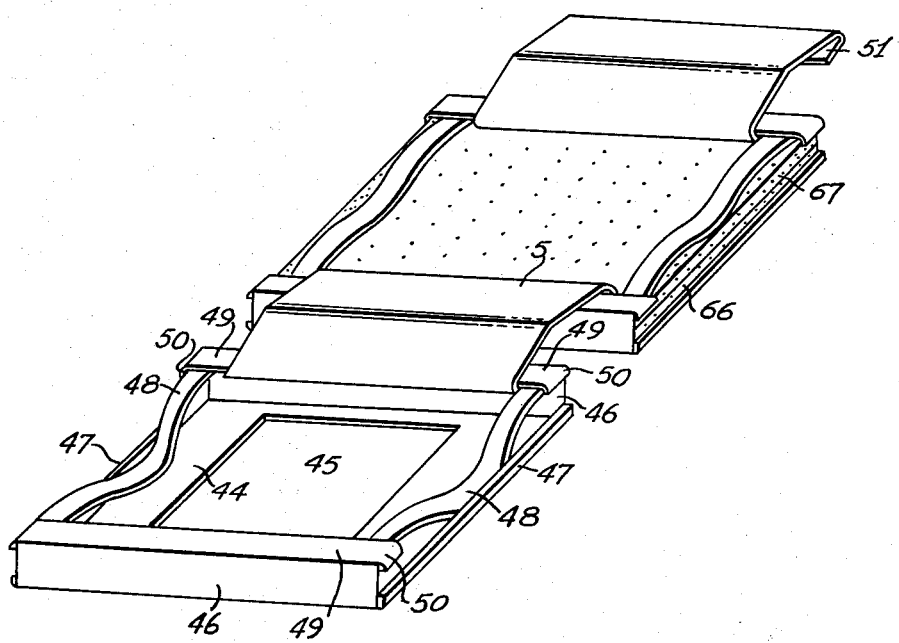
Fig. 4 is two perspective views of chain links comprising frames and connecting members.

A perspective view of two such links associated with a corresponding connecting member is given in Fig. 4. The frame properly speaking has the reference numeral 44 and is formed with a central opening 45 for the picture. The sides 46 of the frame lying in the direction of motion are bent at right angles but only so far as to prevent the glasses 66 and 67 covering the picture from sliding out of the frame. The glasses 66 and 67 are inserted into the frame past the lateral edges 47 until they are completely surrounded by the lateral edges 46 and 47. Two leaf springs 48 hold the glasses 66 and 67 under pressure in the frame by engaging under the flange 49. In order to prevent an incidental outward sliding of the springs, the lateral ends 50 of the flanges 49 are slightly bent down. Inward displacement of the springs is prevented by the connecting member 5.

The connecting member 5 is so designed that it will serve the following purposes:

(a) By being bent on both ends such as 51 to provide a selective connection between two frames which is detachable by hooking in or out;

(b) By selection of an appropriate angle of the bent portion 51 to provide sufficient clearance for the flange of the frame in order to permit that the frames assembled to form a chain lie hingedly on the round bow 2;

(c) By providing a sharp bending edge at the bent portion 51 so that the edges of the flanges 49 move frictionless like a balance beam on a sharp edge;

(d) By using a solid unperforated sheet material to prevent light from the glow lamp 36 to escape between the frames;

(e) By so selecting the dimensions and form of the edges that the gripper 24 will be able to engage the chain from inside or outside and to advance it.

In order to be able to use also chains with a greater number of diapositives it is convenient to provide in the bottom of the casing 1 an opening 52 which may be closed and through which the picture chain extends downwardly.

Figure 6:
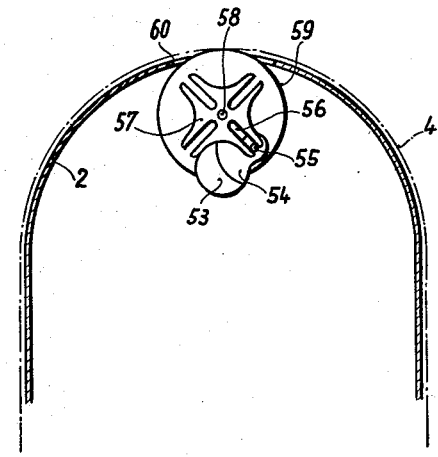
Fig. 6 shows an arrangement with a Maltese cross.

As already mentioned above a periodic discontinuous drive may also be obtained by the use of a Maltese cross. Figure 6 shows a corresponding example. A motor drives disk 53, which is provided on the outside of its recess 54 with a pin 55, which engages a slit 56 of the Maltese cross 57 thereby also periodically rotating the shaft 58 of the cross. The wanted movement of the members 4 of the chain is obtained via a friction-roll 59 projecting from a recess 60 of the semi-circular bow 2. Instead of a friction-roll 59 it is also advantageously possible to use a correspondingly shaped chain-wheel.

Figure 7:
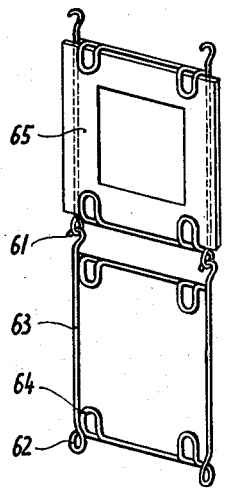
Fig. 7 shows an arrangement with claws instead of frames.

A further simplication of the chain of pictures is shown by Figure 7. Instead of the frames just chain-members 63, formed from wire are used having on each corner a crawl 64, which clamp the diapositives 65. In order to connect the individual members 63 of the chain, special connecting attachment-collars are used or hooks and loops.

Figure 8:
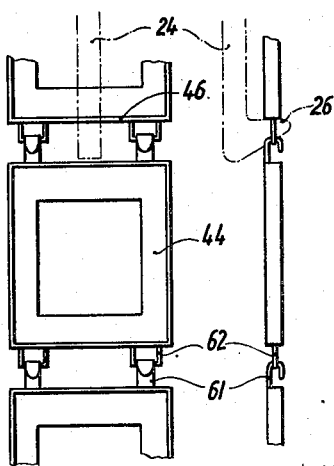
Fig. 8 shows a special construction in the case of using frames.

Figure 8 shows a front and side view of a chain of pictures, the connection between the individual members being obtained by hooks 61 and loops 62 secured to the frame 44, the gripper 24 engaging with its nose 26 directly on the side 46 of frame 44.

What I claim is:

1. A projector comprising a bow capable of acting as a guide and as a means of suspension, and an endless chain of diapositives arranged in an end-to-end relationship to each other suspended on said bow, a driving mechanism capable of moving said diapositives whereby said latter are brought into the trace of rays of lighting apparatus accommodated internally of said guide, furthermore said endless chain comprising individual links, each of which comprises a frame and these frames being pivotally and detachably hooked together by means of connecting members and having lateral upwardly bent edges running in the direction of motion of the chain which edges are again bent inwardly at right angles so as to form flanges to permit hook-like bent portions of the frames serving as bearing surfaces for two leaf springs in each frame, said leaf springs holding two glass plates having the film picture between them firmly in the frame, the lateral ends of the flange-type bent portions showing narrow bent rims in order to prevent the springs from sliding off outwardly, inward displacement of said leaf springs being prevented by said connecting members.

2. A projector comprising a bow capable of acting as a guide and as a means of suspension, diapositives arranged in an end-to-end relationship to each other to form an endless chain suspended on said bow so as to freely depending therefrom, further comprising a driving mechanism capable of moving said diapositives whereby said latter are brought into the trace of rays of lighting apparatus accommodated internally of said guide, further comprising a ratchet-type gripper capable of being driven by said drive mechanism and of engaging with projections and recesses of the chain, said gripper and drive mechanism being so dimensioned that the time during which the chain is in motion is a multiple of its stoppage time, further including power means for driving through a reduction gearing two crank pins offset at an angular distance of 180° from each other and actuating alternately by means of a spring loaded draw hook a one-armed main lever carrying said gripper, said gripper engaging in the position of rest of said main lever with the chain thereby advancing the chain by the length of one picture during movement of the main lever in clockwise direction owing to one of the crank pins being taken along by the draw hook.

3. A projector comprising a bow capable of acting as a guide and as a means of suspension, an endless chain of diapositives arranged in an end-to-end relationship to each other suspended on said bow, a driving mechanism capable of moving said diapositives whereby said latter are brought into the trace of rays of a lighting apparatus accommodated internally of said guide, further comprising a ratchet-type gripper capable of being driven by said drive mechanism and of engaging with projections and recesses of the chain, said gripper and drive mechanism being so dimensioned that the time during which the chain is in motion is a multiple of its stoppage time, further comprising a motor capable of driving through a reduction gearing two crank pins being offset from each other by 180°, said crank pins actuating alternately by means of a spring loaded draw hook a one-armed main lever carrying said gripper, said gripper engaging in the position of rest of said main lever with the chain thereby advancing the chain by the length of one picture during movement of the main lever in clockwise direction owing to one of the crank pins being taken along by the draw hook, a power transmission capable of being disengaged by suitable means and arranged between drive motor and crank gear shaft, said chain of diapositives being arranged in the form of an endless chain, the individual links of which each comprise a frame and these frames being pivotally and detachably hooked together by means of connecting members and having lateral upwardly bent edges running in the direction of motion of the chain which edges are again bent inwardly at right angles so as to form flanges to permit hook-like bent portions of the connecting members to be slid thereon, said hook-like bent portions of the frames serving as bearing surfaces for two leaf springs in each frame, said leaf springs holding two glass plates having the film picture between them firmly in the frame, the lateral ends of the hook-like bent portions showing narrow bent rims in order to prevent the springs for sliding off outwardly, inward displacement of said leaf springs being prevented by said connecting members.

KARL SCHMITT.

References Cited in the file of this patent

UNITED STATES PATENTS

| Number | Name | Date |
|---|---|---|
| 771,828 | Mead et al. | Oct. 11, 1904 |
| 992,366 | Mack et al. | May 16, 1911 |
| 1,028,692 | Dusseris et al. | June 4, 1912 |
| 1,208,218 | Scheller | Dec. 12, 1916 |
| 1,226,177 | Billings | May 15, 1917 |
| 1,590,704 | Smelroth | June 29, 1926 |
| 2,194,240 | Worth | Mar. 10, 1940 |
| 2,196,918 | Hepworth et al. | Apr. 9, 1940 |
| 2,586,176 | Olsen | Feb. 19, 1952 |

FOREIGN PATENTS

| Number | Country | Date |
|---|---|---|
| 204,437 | Great Britain | Oct. 4, 1923 |